O. J. SUMMERS.
REAMING TOOL.
APPLICATION FILED APR. 28, 1917.
1,249,240.
Patented Dec. 4, 1917.
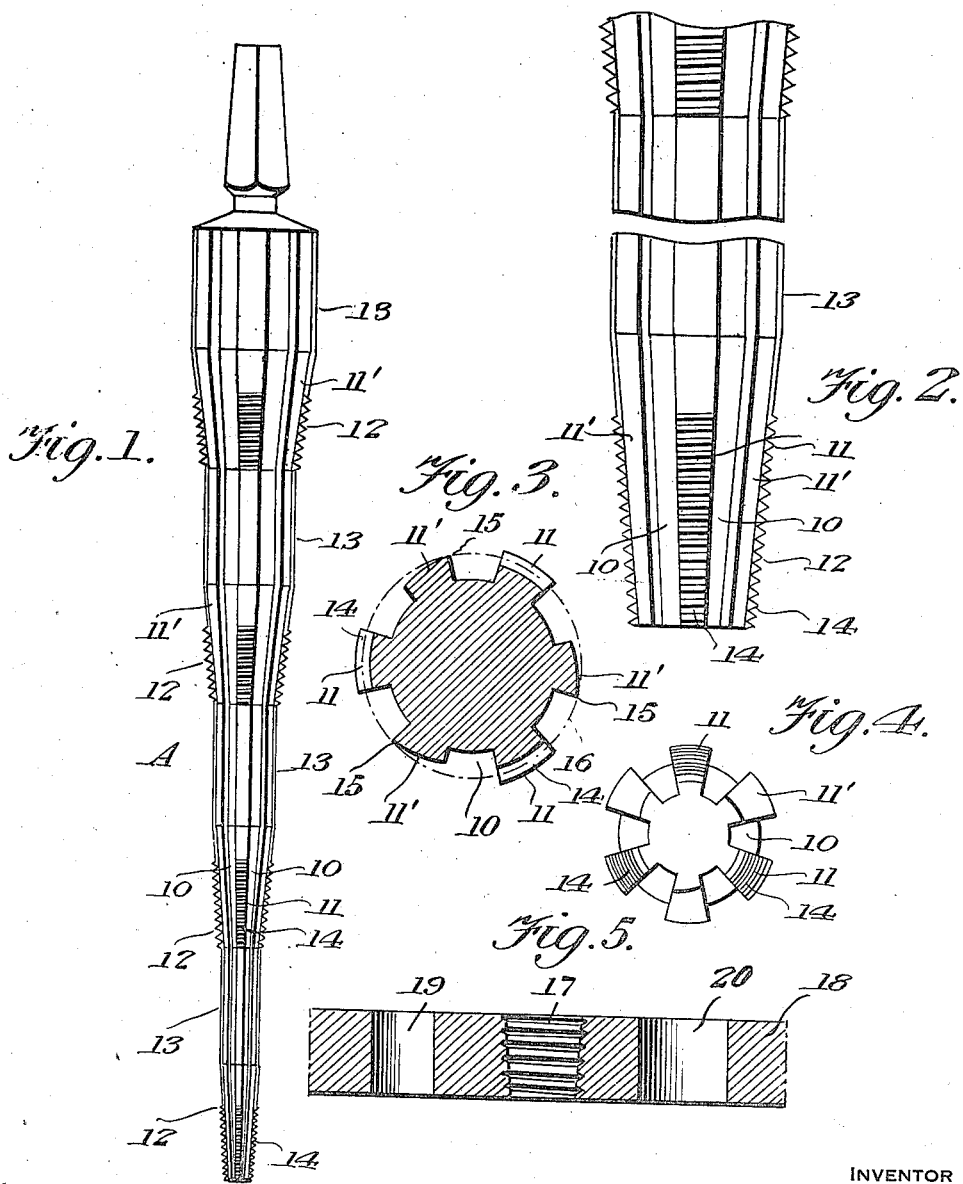
WITNESSES
INVENTOR
O. J. Summers
BY Victor J. Evans
ATTORNEY

UNITED STATES PATENT OFFICE.

OVERN J. SUMMERS, OF MEMPHIS, TENNESSEE.

REAMING-TOOL.

1,249,240.   Specification of Letters Patent.   Patented Dec. 4, 1917.

Application filed April 28, 1917. Serial No. 165,241.

*To all whom it may concern:*

Be it known that I, OVERN J. SUMMERS, a citizen of the United States, residing at Memphis, in the county of Shelby and State of Tennessee, have invented new and useful Improvements in Reaming-Tools, of which the following is a specification.

This invention relates to reaming tools and aims to design a tool of this character, by means of which a plurality of different size holes can be reamed, and each hole made smooth and of uniform diameter throughout its length.

To this end the invention provides a tool embodying a plurality of superimposed sections of gradually increased dimensions relatively, and each section comprising a tapered threaded portion disposed in advance of a portion of uniform diameter throughout its length, the sections being fluted in the usual well known manner.

In carrying out the invention only every other one of the ribs of the tapered portion are threaded, while the remaining ribs are provided with cutting edges which follow the threaded ribs for the purpose of cutting the wall of the hole being reamed approximately one-half the depth of the grooves made by the threaded ribs.

Another important object of the invention resides in the fact that the threads of the tapered portion terminate short of the upper end thereof, so that before the tapered portion is wholly passed through the hole being reamed, all of said ribs of this portion, instead of every alternate one, functions to cut away the material loosened by the threads, and preparing the wall of the hole to be reamed smoothly, by the ribs of the portion of uniform dimension of each section, whereby a hole of uniform diameter is made.

The nature and advantages of the invention will be better understood from the following detail description when read in connection with the accompanying drawing, the invention residing in the construction, combination and arrangement of parts as claimed.

In the drawing forming part of this specification like numerals of reference indicate similar parts in the several views and wherein:—

Figure 1 is an elevation of a complete tool constructed in accordance with my invention.

Fig. 2 is an enlarged elevation of a portion of said tool.

Fig. 3 is a horizontal sectional view taken through one of the tapered portions of the tool.

Fig. 4 is a bottom plan view of the tool.

Fig. 5 is a sectional view through a piece of material showing the character of work performed by the tool.

Referring more particularly to the drawing in detail, A indicates generally the tool, which in accordance with my invention is made up of a plurality of identically constructed superimposed sections, of gradually increasing dimensions relatively. The tool is provided with reaming flutes 10, defining ribs 11 running lengthwise of the tool, and it might here be stated that I do not limit myself to any particular size of tool, or the number of ribs provided in a single implement. Each section comprises a tapered portion 12 and a straight portion 13 of uniform diameter throughout its length. As clearly shown every alternate rib 11 of the tapered portion 12 is threaded as at 14, while the remaining ribs of this portion 12 which are not threaded, are also alternately disposed whereby one of these ribs will follow each threaded rib for the purpose of cutting the material forming the wall of the hole, which had been previously broken up by the threaded ribs. The ribs 11' are termed cutting ribs, and are provided with a cutting edge 15 which lie in a circumferential line approximately half way of the depth of the threads, as indicated by the dotted line 16 in Fig. 3, so that as the tapered portion 12 is operating within the hole being reamed, the threaded ribs thereof define grooves as clearly illustrated at 17 in Fig. 5, while the cutting ribs cut the material loosened by the threads approximately one-half the depth of the grooves.

The threads on the ribs 11 terminate short of the upper end of the tapered portion as clearly illustrated, so that all the ribs of the tapered portion 12 at a point above the threads, act in unison to cut away the material in the hole loosened or broken up by the threads. Manifestly when the tapered portion 12 has passed through the hole, the latter is partly reamed, and the threads reduced in height. However the greatest diameter of the tapered portion, is slightly less than the diameter of the straight portion 13, so that as the straight portion 13 enters the hole, there is a fraction of an inch in depth of threaded surface left to be cut, say for instance one-sixty-first of an inch. The unthreaded portion of the ribs forming part of the tapered portion 12 merge into the ribs of the straight portion 13, so that as the latter mentioned portion operates within the hole, this threaded surface and some of the material beyond the base of the threads, consistent with the diameter of the straight portion 13 is completely removed, with a result of a smooth hole being provided, which is of uniform diameter throughout its length.

In Fig. 5 I have shown a piece of material indicated at 18, wherein 19 indicates the hole to be reamed. The threaded extremity of the tapered portion is the first to enter the hole 19, and the reamer by means of its threads, feeds itself through the hole by merely turning it. The threads provide the wall of the hole, as it passes therethrough with grooves 17, thus breaking up the solid surface to a marked degree to facilitate the reaming operation to be subsequently performed by the tool. As above stated the cutting ribs 11' of the tapered portion 12 are so disposed with respect to the threaded ribs of the same portion, that as the threaded extremity of the tapered portion passes through the hole, the cutting ribs 11' cut away the material loosened by the threads, for approximately one-half the depths of the grooves produced by the threads. The intermediate opening in the material shown in Fig. 5 shows the condition of the hole 19, when the threaded tapered extremity of the reamer has been positioned therein. As the tool continues to operate within the hole, the unthreaded portion of the ribs forming part of the tapered portion 12, follows the threads through the hole with a reaming action, and as these ribs merge into the ribs of the straight portion 13, the latter finishes the work in the manner above described producing a smooth hole of uniform diameter throughout its length indicated at 20. The gradually increasing dimensions of the sections relatively, permits a single tool constructed in accordance with my invention to ream holes of different sizes.

While it is believed that from the foregoing description the nature and advantages of the invention will be readily apparent, I desire to have it understood that what is herein shown and described, constitutes the preferred embodiment of the invention to which I do not limit myself, and that such changes may be resorted to when desired, as fall within the scope of what is claimed.

What is claimed is:—

1. A reamer embodying a plurality of sections of gradually increasing dimensions relatively, each section including a tapered portion and a straight portion alternately disposed throughout the length of the tool, and said tool being provided with reaming flutes running lengthwise, said flutes of the tapered portions being threaded for a portion of their length.

2. A reamer embodying a plurality of sections of gradually increasing dimensions relatively, each section including a tapered portion and a straight portion alternately disposed throughout the length of the tool, said tool being provided with flutes running lengthwise, and the flutes of said tapered portion being alternately threaded for a portion of their length.

3. A reamer embodying a plurality of sections of gradually increasing dimensions relatively, each section including a tapered portion and a straight portion alternately disposed throughout the length of the tool, said tool being provided with flutes running lengthwise and defining cutting ribs, and certain of said ribs forming part of the tapered portion being threaded for a portion of their length.

4. A reamer embodying a plurality of sections of increasing dimensions relatively, each section including a tapered portion and a straight portion alternately disposed throughout the length of the tool, said tool being provided with flutes running lengthwise and defining ribs, and every alternate rib of the tapered portion being threaded for a portion of its length, and the remaining ribs of said portion being provided with cutting edges as and for the purpose described.

5. A reamer embodying a plurality of sections of gradually increasing dimensions relatively, each section including a tapered portion and a straight portion alternately disposed throughout the length of the tool, said tool being provided with flutes running lengthwise defining ribs, every alternate rib of the tapered portion being threaded for a portion of its length, and the remaining ribs of said portion being provided with cutting edges and terminating in a circumferential line approximately half way of the depth of the threads as and for the purpose described.

In testimony whereof I affix my signature.

OVERN J. SUMMERS.